H. C. EGERTON.
VALVE MEMBER, &c.
APPLICATION FILED OCT. 18, 1918.
1,352,735.
Patented Sept. 14, 1920.
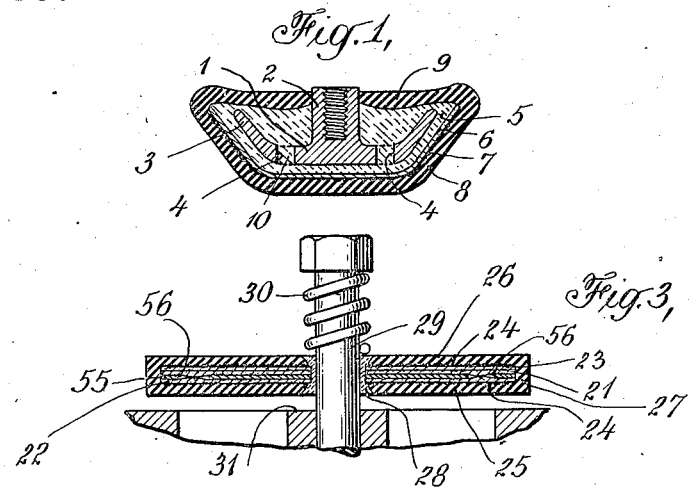
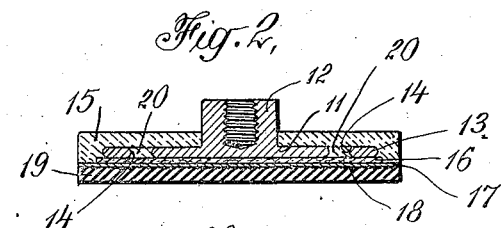
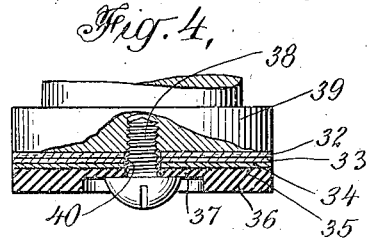
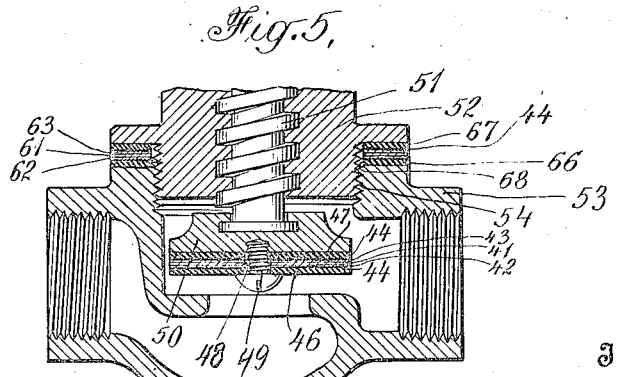
Inventor
Henry C Egerton
By his Attorney
Harry L Duncan

UNITED STATES PATENT OFFICE.

HENRY C. EGERTON, OF RIDGEWOOD, NEW JERSEY.

VALVE MEMBER, &c.

1,352,735. Specification of Letters Patent. Patented Sept. 14, 1920.

Application filed October 18, 1918. Serial No. 258,744.

*To all whom it may concern:*

Be it known that I, HENRY C. EGERTON, a citizen of the United States, and resident of Ridgewood, county of Bergen, and State of New Jersey, have made a new and useful Invention Relating to Valve Members, &c., of which the following is a specification, taken in connection with the accompanying drawing.

This invention relates particularly to water and other valve members or washers comprising vulcanized rubber facing members secured to fabric or other connector members comprising phenolic condensation stiffening and cementing material by which the connector may be secured to the valve body or other member. The valve body may in some cases be formed of such phenolic condensation cementing material or fabric carrying or impregnated with such cementing material for which purpose bakelite, condensite or redmanol varnish or other compositions may be used if desired. Such cementing material or fabric or other fibrous material carrying the same or impregnated therewith is advantageous for such purposes because of its stiffness and strength and because it is substantially waterproof and impervious to moisture as well as substantially unaffected by ordinary heat up to several hundred degrees Fahrenheit.

In the accompanying drawings showing in a somewhat diagrammatic way illustrative embodiments of this invention—

Figure 1 is a transverse section through a form of valve.

Figs. 2 to 4 are sectional views showing other valve constructions; and

Fig. 5 is a sectional view through another form of valve provided with such washer or packing members.

As indicated in Fig. 1 the valve may comprise a valve plate or support 1 of iron, brass or other metal or material which may be conveniently formed with a threaded neck 2 and with a flange 3 of somewhat conical shape generally corresponding to the valve seat with which the valve is to coöperate. If desired suitable attaching holes or apertures may be formed in this valve plate or support such as the holes 10 which facilitate the union of the cementing or plastic material used to form the valve body 5. For this purpose a suitable mixture of fibrous material, such as relatively short or chopped cotton fiber, thread or the like, may be incorporated with bakelite varnish or other suitable phenolic condensation cementing material and dried at moderate heats and then on heating sufficiently to render it plastic this material may be molded under pressure around the valve plate so as to penetrate the attaching holes therein and form the valve body 5, of some such shape as indicated. It is usually desirable to secure to this valve body at least throughout the portion coöperating with the valve seat a suitable connector member which may advantageously be formed of woven or knit fabric such as cotton duck or heavy knit cotton fabric which is somewhat more elastic and yielding where the connector 6 is to be stamped or shaped up into some such cup-shaped configuration as indicated. It is advantageous to form this connector fabric with a frictioned or other rubber coating 7 on its outer surface and the inner surface may, if desired, be coated or more or less impregnated with suitable phenolic condensation cementing material, such as bakelite varnish No. 1 which should be dried before assembly of the parts. Or, if desired, the phenolic condensation cementing material forming the body of the valve may under the molding pressure and heat used be forced out and into the connector so as to securely cement it in position. The valve may as indicated be formed with a vulcanized rubber facing 8 secured to the connector and vulcanized thereto, and if desired this covering of vulcanized rubber may extend around to form a top facing 9 giving the article a more smooth and uniform appearance and giving the additional protection against water penetration.

A convenient way to form such a valve is by a heat and pressure molding operation. The rubber composition preferably of a pure high grade may be placed in the mold and the other parts put in place and then the mold may be closed and forced strongly together while the mold is heated in any suitable way so as to secure a temperature of 250 to 300 degrees F. more or less, which is sufficient to vulcanize the rubber and simultaneously cure or solidify the phenolic condensation cementing material and permanently and strongly unite the parts. In this way the rubber is vulcanized to the connector fabric and a high degree of adherence thereto is secured while the fabric is simultaneously secured to the phenolic condensation cementing material forming the body of the valve which may contain some thirty to sixty per cent. by weight of such cementing material.

In Fig. 2 another arrangement is shown in which the support or plate 11 is substantially flat and may be formed with a projecting neck 12 provided with a threaded aperture for connection with the valve stem. The outer edge 13 of this valve plate may be corrugated or recessed or formed with attaching holes or apertures 14 to facilitate the union of the other elements, such as the stiffening and supporting fabric 16 of canvas or other cloth, paper or the like, preferably of an open porous texture which has been coated or impregnated with phenolic condensation cementing material so that when dried at the usual moderate temperature of 175° F. more or less, the fabric contains thirty to fifty or sixty per cent. of such phenolic condensation cementing material. One or more such layers of fabric 16 may be arranged adjacent the valve plate and cemented thereto to form in connection therewith a practically rigid valve body and a connector fabric 17 may be arranged in contact with such supporting fabric and preferably of such size as to extend out to the periphery of the valve which facilitates the manufacturing operations. If desired a frictioned or other coating 18 of rubber may be applied to the lower face of this connector fabric and in some cases the other side thereof may be coated or impregnated with such phenolic condensation cementing material before the parts are molded and cemented together under the desired heat and pressure. It is not, however, necessary in all cases to apply such cementing material directly to this connector fabric, since if ample phenolic condensation cementing material is used in the adjacent supporting fabric 16 the heat and pressure of the molding operation forces a sufficient amount thereof into the connector fabric to cement the two together. In some cases also it is sufficient to use as the connector fabric a layer of canvas or similar cloth or fabric which has been impregnated with phenolic condensation cementing material and then in the molding operation the layer or sheet of rubber 19 to form the valve facing may be forced strongly into contact with this fabric in the vulcanizing mold, whereupon the heat sufficiently softens this phenolic condensation cementing material so that the rubber can force its way into the threads and interstices of the fabric to displace the phenolic condensation cementing material to a sufficient extent to thoroughly unite the rubber with the fabric. As indicated in Fig. 2 the valve may, if desired, have a body 15 of fibrous or porous material carrying or impregnated with phenolic condensation cementing material which may be molded in place so as to engage the irregular portions or apertures 14 in the valve plate and be cemented to the supporting or connecting fabric in this way so as to rigidly and permanently unite the parts of the valve when the curing and vulcanizing treatment is complete.

Fig. 3 shows another arrangement in which the valve is formed with a body or stiffening member 21 comprising one or more layers of cotton duck or other suitable fabric which may be thoroughly impregnated with such phenolic condensation cementing material so that when cured the cementing and stiffening material gives ample strength to this valve body and rigidly supports the other parts of the valve. Metallic supports or stiffening members of perforated plate, wire gauze, etc., may be used, if desired, to stiffen the valve or other article and secure it to coöperating members and thus facilitate the reliable and strong mounting of any vulcanized rubber member or portion. For this purpose the valve plate or metallic stiffening member 55 may be incorporated in and cemented to such body fabric, and if desired, formed with apertures 56 to facilitate the cementing union of the parts. One or more layers of connector fabric 22, 23, may be united to the body fabric and may, if desired, be formed with frictioned or other rubber coatings 24 on their exposed surfaces so as to facilitate the vulcanizing union therewith of the vulcanized rubber facing 25 which may constitute the working face of the valve and also if desired the inclosing edge portion 27 and rear face 26 which enables the valve to be reversed in position and used on both sides, if desired. It is advantageous to form the valve with phenolic condensation cementing material which may be interposed in such bearing portions of the valve as engage any guiding or other relatively moving elements. As shown in Fig. 3, the valve may for this purpose be formed with a bearing member 28 around the guiding stud 29 upon which the valve moves under the influence of the spring 30 to close the apertured valve seat 31. This bearing member may be advantageously formed of porous or fibrous material and incorporated phenolic condensation cementing material which may directly engage the stiffening and other fabric of the valve and be rigidly and permanently cemented thereto and thus form a strong and tough bearing member having very much better wearing properties than the rubber elements of the valve. All these parts may of course be cemented together and cured and vulcanized in the vulcanizing mold under the degree of heat and pressure suitable for the rubber and phenolic condensation cementing compositions used.

Another arrangement is shown in Fig. 4 as comprising a stiffening body fabric which may consist of one or more layers 32, 33 of canvas or other fabric coated or impregnated with such phenolic condensation cementing material and to which the vulcanized rubber facing 36 of the valve may be secured in any suitable way. It is usually desirable to interpose a connector layer of fabric 34 between the rubber and stiffening fabric and by giving this connector a frictioned or other rubber coating adjacent the rubber valve facing, the union of the parts may be facilitated. All of these parts may of course be assembled in a vulcanizing curing mold and forced together under the desired curing heat which simultaneously vulcanizes the rubber and unites it to the connector and cures or solidifies the phenolic condensation cementing material in the other elements, so that they are permanently retained in this desired position under service conditions. The strong adherence of the rubber facing to the strong and stiff fabric elements of the valve member is advantageous because it prevents spreading or slipping of the rubber as it is compressed against the valve seat and slip of course promotes the wear or destruction of such a valve facing. Where as indicated the valve member is to be secured to a metallic plug 38 of a compression valve, for instance, it is advantageous to form a thin sealing layer 37 of rubber where the screw 38 or other attaching device engages the valve member. This thin layer of rubber may thus be compressed sufficiently to securely seal the joint around the screw where it passes through the hole 40 in the valve member and penetration of water or other liquid past the threads of the screw is thus prevented. Fig. 5 shows another arrangement in which the stiffening or body fabric 41 may be formed of one or more layers of canvas or other fabric coated or impregnated with such phenolic condensation cementing material. One or more connector layers 42, 43 may be arranged on one or both sides of the body fabric and secured thereto during the heat curing and molding of the valve member which may simultaneously unite the facing of vulcanized rubber or other suitable composition 46, 47 to one or both sides of the valve member in connection, if desired, with frictioned rubber coatings 44 on the connectors. In this way a reversible valve member is secured which may be molded or formed separately with a hole 48 to coöperate with the attaching screw or device 49 or the valve or packing member may be held in place in other ways. Of course such a member may be produced by first forming a large sheet or piece of such material and then stamping or cutting therefrom the individual washers or packing members which may be given such size and shape and formed with such holes as are necessary to coöperate with the valve or other members with which they are used. As shown in Fig. 5 a gasket or packing member of this character is interposed between the valve casing 53 and the valve bonnet 52 in which operates the screw 51 connected with the valve plug 50. This washer may comprise the body or stiffening layer or member 61 impregnated with or carrying such phenolic condensation cementing material and one or more connector layers 62, 63 to which the rubber facing members 66, 67 may be vulcanized at the same time that the phenolic condensation cementing material in the body and other members is cured and solidified. Such a washer may be stamped out of a sheet or molded separately so as to form its periphery and the internal hole or aperture 68 of the desired size to accommodate the threads 54 on the bonnet.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims:

1. The valve comprising a metallic valve plate having apertured attaching portions, a stiffening supporting fabric coöperating with said valve plate and carrying cured phenolic condensation cementing and stiffening material and coöperating with said attaching portions and uniting said supporting fabric to said valve plate, fabric connector members cemented to said supporting fabric by said cementing material and a vulcanized rubber facing adhesively and permanently secured to said connector members on both sides of said valve.

2. The valve comprising a metallic valve plate, stiffening supporting fabric coöperating with said valve plate and carrying cured phenolic condensation cementing and stiffening material uniting said supporting fabric to said valve plate, fabric connector members cemented to said supporting fabric by said cementing material and a vulcanized rubber facing adhesively and permanently secured to said connector members on both sides of said valve.

3. The valve member comprising stiffening supporting fabric carrying cured phenolic condensation cementing and stiffening material, fabric connector members cemented to said supporting fabric by said cementing material and a vulcanized rubber facing adhesively and permanently secured to said connector members on both sides of said valve member.

4. The valve member comprising stiffening supporting fabric carrying cured phenolic condensation cementing and stiffening material, a fabric connector member cemented to said supporting fabric by said cementing material and a vulcanized rubber facing adhesively and permanently secured to said connector member.

5. The valve member comprising a metallic valve plate having apertured attaching portions, stiffening body fabric carrying cured phenolic condensation cementing material and engaging and cemented to said plate, a connector fabric engaging said body fabric and cemented thereto, and carrying a frictioned rubber coating, a vulcanized rubber facing layer vulcanized to said connector to be permanently and strongly secured to said body fabric, and a centrally located apertured bearing member comprising fibrous material and cured phenolic condensation cementing material cemented to said fabric and substantially flush with said facing layer.

6. The valve member comprising a stiffening body fabric carrying cured phenolic condensation cementing material, a connector fabric engaging said body fabric and cemented thereto, a vulcanized rubber facing layer vulcanized to said connector to be permanently and strongly secured to said body fabric and a bearing member comprising fibrous material and cured phenolic condensation cementing material cemented to said fabric.

7. The valve member comprising a stiffening fabric carrying cured phenolic condensation cementing material, a vulcanized rubber facing layer vulcanized to and strongly secured to said fabric, and a bearing member comprising cured phenolic condensation cementing material cemented to said fabric.

8. The valve member comprising stiffening fabric carrying cured phenolic condensation cementing material, a vulcanized rubber facing layer permanently and strongly secured to said fabric and a bearing member comprising cured phenolic condensation cementing material cemented to said fabric.

9. The valve or packing member comprising stiffening fabric carrying cured phenolic condensation cementing material and a vulcanized rubber layer permanently and strongly secured to said fabric.

10. The article of manufacture comprising a metallic support having apertured attaching portions, stiffening body fabric carrying cured phenolic condensation cementing material and engaging and cemented to said support, a connector fabric engaging said body fabric and cemented thereto, and carrying a frictioned rubber coating and a vulcanized rubber facing layer vulcanized to said connector to be permanently and strongly secured to said body fabric.

11. The article of manufacture comprising a metallic support having stiffening fabric carrying cured phenolic condensation cementing material and engaging and secured to said support, connector fabric engaging said stiffening fabric and cemented thereto, and a vulcanized rubber facing layer vulcanized to said connector to be permanently and strongly secured to said stiffening fabric.

12. The article of manufacture comprising a metallic support having fabric carrying cured phenolic condensation cementing material and secured to said support, and a vulcanized rubber portion permanently and strongly secured to said fabric.

13. The article of manufacture comprising stiffening body fabric carrying cured phenolic condensation cementing material, connector fabric engaging said body fabric and cemented thereto, a vulcanized rubber facing layer vulcanized to said connector to be permanently and strongly secured to said body fabric and a bearing member comprising fibrous material and cured phenolic condensation cementing material cemented to said fabric.

14. The article of manufacture comprising stiffening body fabric carrying cured phenolic condensation cementing material, connector fabric engaging said body fabric and cemented thereto, a vulcanized rubber facing layer permanently and strongly secured to said body fabric.

15. The article of manufacture comprising stiffening fabric carrying cured phenolic condensation cementing material and a vulcanized rubber portion permanently and strongly secured to said body fabric.

16. The article of manufacture comprising a sheet of fibrous material carrying cured phenolic condensation cementing material and a vulcanized rubber composition facing layer permanently and strongly secured to said fibrous material on both sides thereof.

17. The article of manufacture comprising a layer of fibrous material carrying cured phenolic condensation cementing material and a rubber composition portion permanently and strongly secured to said fibrous material.

18. The article of manufacture comprising a metallic perforated plate support having a sheet of fibrous material carrying cured phenolic condensation cementing material secured to said support and a vulcanized rubber composition facing layer permanently and strongly secured to said fibrous material.

19. The article of manufacture comprising a metallic support having a sheet of fibrous material carrying cured phenolic condensation cementing material secured to said support and a rubber composition portion permanently and strongly secured to said fibrous material.

HENRY C. EGERTON.